3,536,613
UPGRADING PETROLEUM-SOUR WATERS
Robert Kunin, Yardley, and Frank X. Pollio, Philadelphia, Pa., assignors to Rohm and Haas Company, Philadelphia, Pa., a corporation of Delaware
No Drawing. Filed Sept. 3, 1968, Ser. No. 757,094
Int. Cl. B01d *15/04, 19/00*
U.S. Cl. 210—26                                            6 Claims

ABSTRACT OF THE DISCLOSURE

Using an ion exchange technique based on the use of weak electrolyte ion exchange resins, it is possible to purify petroleum-sour waters which originate from petroleum refining operations. The present technique provides for the removal of $H_2S$, $NH_3$, and phenolics as well as minor amounts of inorganic salts which are present in the petroleum-sour waters.

---

This invention relates to the upgrading or renovating of petroleum-sour waters. Petroleum-sour waters are common to practically every petroleum installation where refining is practiced. The sour or foul waters, aptly named because of their foul smell, acquire their characteristic pollutant loads from the gas and liquid stripping operations performed during various stages of petroleum refining operations. The principal contaminants in the sour water are $NH_3$ and $H_2S$ which result primarily from the treatment with hydrogen of crude oil feed stocks containing nitrogen and sulfur. Heretofore, it has been the practice to dump the sour waters directly into surface streams, rivers and other waterways. However, in view of recent legislation and government activity restricting such activities, it is necessary to upgrade petroleum-sour waters and the present invention provides an efficient technique for carrying out this objective. The upgrading of the petroleum-sour water according to the present invention is such that the water may be recycled for further use, if desired, or dumped without fear of pollution; also, if desired, the $NH_3$ and $H_2S$ may be recovered in relatively pure states.

In the preferred embodiment of this invention, the petroleum-sour waters are first passed through a bed of a weak carboxylic acid cationic exchange resin. In this first stage of the operation, ammonium ions (the $NH_3$ and $H_2S$ are present in the sour water in chemically combined form, i.e., as ammonium bisulphide) are exchanged for hydrogen ions which results in the liberation of free $H_2S$ in the effluent water, which can then be stripped under reduced pressure from the decationized effluent sour water and recovered if so desired. The effluent water which has then been stripped of $H_2S$ may then be passed through a bed of a weak anionic exchanger to remove any phenolics still present in the water.

The preferred classes of weakly acidic cation exchangers used in the process of the present invention are those in which the cation exchange activity is due to the presence of carboxylic acid groups in the molecule. Such resins are well known and commercially available and the preparation of resins of this type is set forth in U.S. Pat. Nos. 2,319,359; 2,333,754; 2,340,110 and 2,340,111. A suitable cation exchanger is one having carboxylic acid groups in the molecule, prepared by suspension copolymerizing a mixture of methacrylic acid and about 3 to 10 percent divinylbenzene. This type of resin is commercially available as Amberlite IRC–50. Another and more preferred cationic exchanger is one having carboxylic acid groups in the molecule and which is prepared by hydrolyzing a copolymer of methyl acrylate, 10–20% acrylonitrile and 3–10% divinylbenzene. This type of resin is commercially available as Amberlite IRC–84. The Amberlite resins are available from Rohm and Haas Company, Philadelphia, Pa. Numerous other well-known types of carboxylic acid cation exchangers such as hydrolyzed styrene maleic anhydride copolymer cross-linked with divinylbenzene, and others of this general nature may also be used.

Examples of the weakly basic anion exchange resins which may be employed in this invention are those disclosed in U.S. Pat. Nos. 2,354,671; 2,356,151; 2,402,384; and 2,675,359. Some of the resins may be conveniently prepared by reaction of phenols with formaldehyde and a polyalkyleneamine. Another type of weak base resin and one which is actually preferred is prepared as described in U.S. Pat. No. 2,591,574 by reacting a halomethylated cross-linked copolymer with a primary or secondary amine. Commercial chloromethylated and aminated styrene-divinylbenzene beads are commercially available under the trademark Amberlite IR–45 and Amberlite IRA–93.

In the following examples all parts and percentages are by weight unless otherwise stated.

EXAMPLE I

Petroleum-sour waters having the following analysis were treated:

TABLE I

Sour water analysis

| | |
|---|---:|
| pH | 8.6 |
| Sp. Resist, ohm-cm. | 440 |
| M.O. Alkalinity, p.p.m. as $CaCO_3$ [1] | 1180 |
| TDS, p.p.m. as $CaCO_3$ [2] | 1310 |
| $H_2S$, p.p.m. as S | 1150 |
| $NH_3$, p.p.m. as N | 390 |
| Phenolics, p.p.m. as phenol | 365 |
| Suspended solids, p.p.m. | 8 |

[1] M.D.=methyl orange.
[2] TDS=total dissolved solids.

The sour water was passed through a 25 ml. bed of Amberlite IRC–84, operated in the hydrogen cycle, at a flow rate of one gallon/cu. ft./min. (8 BV [3]/hr.). The effluent water containing liberated $H_2S$ was stripped using an aspirator (reduced presssure of about 40–50 mm. Hg.). The water stripped of its $H_2S$ was then passed through another 25 ml. bed of Amberlite IR–45 (in free base form) at a flow rate of one gallon/cu. ft./min. to remove phenolics still present in the water. During treatment of the sour water with Amberlite IRC–84, a total of 60 BV (Ca. 34 kgr./cu. ft., as $CaCO_3$) of effluent were collected as bed volume fractions and evaluated for pH and specific resistance. The bed had not been exhausted but the run was terminated because of time and the size of the sample of water. As can be seen by the data, the column still had an

[3] BV=bed volume.

appreciable amount of capacity remaining. The data are tabulated in Table II.

TABLE II.—AMBERLITE IRC-84 (H) TREATMENT OF SOUR WATER

Resin bed volume = 25 ml.
Flow rate = 1 gal./cu.ft./min.

| Sample: | Bed volume fraction | pH | Specific resist., ohm-cm. |
|---|---|---|---|
| 1 | 1–2 | 2.75 | 900 |
| 2 | 9–10 | 2.95 | 900 |
| 3 | 19–20 | 3.15 | 1,370 |
| 4 | 29–30 | 3.30 | 1,400 |
| 5 | 39–40 | 3.40 | 1,400 |
| 6 | 49–50 | 3.45 | 1,360 |
| 7 | 59–60 | 3.60 | 1,440 |

The bed volume fractions were subsequently added together and subject to reduced pressure using a water aspirator in order to strip the $H_2S$. Surprisingly the $H_2S$ was stripped rather readily, with the stripping being accelerated when the sour-water was warmed slightly (30–35° C.). Less than five minutes was usually required in order to obtain a negative lead acetate (PbAc) paper test, which is very sensitive to trace amounts of $H_2S$. After the stripping operation, essentially no detectable change in pH or specific resistance was noted. To check the extent of $H_2S$ removal quantitatively, sample of the original sour-water and of a 60 BV composite of $H_2S$ stripped effluent were titrated iodometrically and an iodine demand value obtained for each sample. The iodine values, in essence, are a measure of the $H_2S$ present in the samples. According to the $I_2$ demand measurement, an apparent 97 percent $H_2S$ reduction was achieved through the Amberlite IRC-84 (H)[1] treatment and reduced pressure stripping operation. After the stripping operation, the waters were still acidic (pH 3.0–4.0) and a little turbid probably due to small traces of sulfur formed through the atmospheric oxidation of $H_2S$ during processing. Where further purification of the sour waters which still contain some phenolics is required, the removal of such phenolics can be accomplished by one of two alternate procedures which are given below.

EXAMPLE II

The effluent water after removal of ammonia and $H_2S$ in accordance with procedure in Example I above is treated with lime and flocculants in order to clarify and neutralize the water. To adjust the processed sour water to a pH between 6.0–8.0 there is required about 0.2–0.4 lb. of lime per thousand gallons of treated water. The lime is used as an aqueous suspension. For purposes of clarification only, there can be used 20 to 30 parts per million of bentonite and one to six parts per million of a cationic synthetic polyelectrolyte flocculant such as that available under the designation Primafloc C-7. Details of the clarification treatment are set forth in U.S. Pat. No. 3,300,406. In this manner excellent clarification and/or neutralization is accomplished.

EXAMPLE III

As an alternative to treating the effluent water from Example I with lime and flocculants, the vacuum stripped sour water may be directly passed into a bed of a weakly basic, polystyrene type anion exchange resin. A preferred material is the ion exchange resin Amberlite IR-45. Thus, the vacuum stripped sour water of Example I is passed directly into a column containing a 25 milliliter bed of Amberlite IR-45 (in the free base form) at a flow rate of 1 gallon/cu. ft./min. In this manner the effluent water is completely clarified and the phenolic contaminants are removed. The exit water is odorless indicating that phenolics are absent. (A few p.p.m. of phenol can readily be detected by odor.) The effluent water after treatment with IR-45 was tested for ammonia nitrogen using Nessler

[1] H = hydrogen form.

reagent. Less than 5 p.p.m. N was found to be present. In the table below are presented data showing the properties of the original sour water and the properties of the upgraded water. As can be seen from this table, there is a virtual complete elimination of $H_2S$ and ammonia as well as the phenolic contaminants.

TABLE III.—UPGRADED SOUR WATER PROPERTIES

| | Original water | Upgraded water |
|---|---|---|
| pH | 8.6 | 8.0 |
| Sp. resist., ohm-cm | 440 | 4,000 |
| M.O. alkalinity, p.p.m. as $CaCO_3$ | 1,180 | 180 |
| TDS, p.p.m. as $CaCO_3$ | 1,310 | 210 |
| $H_2S$, p.p.m. as S | 1,150 | (1) |
| $NH_3$, p.p.m. as N | 390 | (2) |
| Phenolics, p.p.m. as phenol | 365 | (3) |
| Suspended solids, p.p.m | 8 | (4) |

[1] Negative PbAc test.
[2] 5 p.p.m. N (Nessler test).
[3] Odorless.
[4] None.

The above examples show dramatically the effectiveness of this invention in removing both ammonia and $H_2S$ from petroleum-sour waters. It is particularly surprising that the $H_2S$ can be so effectively removed. For example, if one treats petroleum-sour water in an effort to remove the $H_2S$ directly by aspirating the sour water, essentially no $H_2S$ will be removed. It is thought that the $H_2S$ is chemically tied up in the sour water and is present as ammonium bisulphide. Thus, the present process provides first of all for the removal of ammonia as ammonium ion which operation at the same time converts the ammonium bisulphide into $H_2S$, which thereafter is readily removed by aspiration and/or warming. The present process is extremely flexible since it can be designed and engineered to produce waters of practically any desired purity. Where the objective is mainly the elimination of ammonia and hydrogen sulfide, the treatment with a weak anion exchange resin or the neutralization and flocculation with lime and alkali and flocculants can be eliminated. Of course, if an acidic pH is objectionable, then the processed sour water can be neutralized and clarified.

The regeneration of the ion exchange beds are simple and reasonable from a cost point of view. The weakly acidic cation exchanger can be regenerated with virtually any acid. In the case of refinery operations there is frequently a good deal of spent $H_2SO_4$ available and this can be used to effectively regenerate the cation exchangers. Alternatively, $SO_2$ available from flue gases can also be utilized effectively to regenerate the cation exchanger. The weakly basic anionic exchange resin can be effectively regenerated with sodium hydroxide, ammonium hydroxide, sodium carbonate lime, or any other readily available alkali regenerant. In the above process operations, should $H_2SO_4$ be used as the regenerant for the weak acid resin, then the waste regenerant would comprise chiefly ammonium sulfate which could be used as a source of the alkali regenerant for the weak anion exchanger.

We claim:
1. A process for the removal of ammonia and hydrogen sulfide from water containing same which comprises first passing the water through a bed of a weak carboxylic acid cation exchange resin whereby ammonium ions are exchanged for hydrogen ions and free hydrogen sulfide is liberated into and retained in the effluent water, and thereafter removing the hydrogen sulfide from the effluent water.

2. A process according to claim 1 wherein the hydrogen sulfide is removed from the effluent water by stripping under reduced pressure.

3. Process according to claim 2 where the stripping is accompanied by heating.

4. Process according to claim 2 wherein the effluent water is thereafter neutralized with an alkaline material and clarified with a flocculant.

5. Process according to claim 2 wherein the effluent water is passed through a second ion exchange bed comprising a weakly basic anion exchange resin, whereby the effluent water is clarified and removal of phenolic contaminants is accomplished.

6. In a petroleum refining process wherein a substantial quantity of sour or foul waste water is produced, the improvement which comprises upgrading said sour water by passing the water through a bed of a weak carboxylic acid cation exchange resin whereby ammonium ions are exchanged for hydrogen ions and free hydrogen sulfide is liberated, and thereafter removing the hydrogen sulfide from the effluent water of the ion exchange bed.

References Cited
UNITED STATES PATENTS

| | | | |
|---|---|---|---|
| 2,916,355 | 12/1959 | Swenson | 210—38 X |
| 2,930,753 | 3/1960 | McMahon | 208—208 X |
| 3,147,215 | 9/1964 | Blight | 210—37 X |

SAMIH N. ZAHARNA, Primary Examiner

U.S. Cl X.R.

208—208; 210—28, 37, 38